(12) United States Patent
Li

(10) Patent No.: US 12,495,362 B2
(45) Date of Patent: Dec. 9, 2025

(54) INACTIVITY TIMER TIMEOUT PROCESSING METHODS AND APPARATUSES

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 600 days.

(21) Appl. No.: 17/608,974

(22) PCT Filed: May 6, 2019

(86) PCT No.: PCT/CN2019/085736
§ 371 (c)(1),
(2) Date: Nov. 4, 2021

(87) PCT Pub. No.: WO2020/223885
PCT Pub. Date: Nov. 12, 2020

(65) Prior Publication Data
US 2022/0217637 A1 Jul. 7, 2022

(51) Int. Cl.
*H04W 52/02* (2009.01)
*H04W 76/28* (2018.01)

(52) U.S. Cl.
CPC ... *H04W 52/0241* (2013.01); *H04W 52/0229* (2013.01); *H04W 52/0248* (2013.01); *H04W 76/28* (2018.02)

(58) Field of Classification Search
CPC ......... H04W 52/0241; H04W 52/0229; H04W 52/0248; H04W 76/28

USPC .......................................................... 370/311
See application file for complete search history.

(56) References Cited

U.S. PATENT DOCUMENTS

| 9,961,718 | B2 | 5/2018 | Vajapeyam et al. |
| 11,611,387 | B2 * | 3/2023 | Cirik ..................... H04L 5/0023 |
| 2016/0286603 | A1 | 9/2016 | Vajapeyam et al. |
| 2021/0306952 | A1 * | 9/2021 | Kuang ................... H04L 69/28 |
| 2021/0314862 | A1 * | 10/2021 | Xu ....................... H04W 72/0453 |
| 2022/0039009 | A1 * | 2/2022 | Iyer ....................... H04L 5/0098 |

FOREIGN PATENT DOCUMENTS

| CN | 107431978 A | 12/2017 |
| CN | 109219116 A | 1/2019 |
| CN | 109496454 A | 3/2019 |
| WO | WO-2017204726 A1 * | 11/2017 ........ H04W 52/0216 |

OTHER PUBLICATIONS

International Search Report of the International Application No. PCT/CN2019/085736 dated Feb. 12, 2020, with English translation, (4p).

* cited by examiner

*Primary Examiner* — Intekhaab A Siddiquee
(74) *Attorney, Agent, or Firm* — Arch & Lake LLP; Hao Tan; Shen Wang

(57) ABSTRACT

An inactivity timer timeout processing method is provided in the present disclosure, the method is applied to a terminal, the terminal is provided with an inactivity timer which is running, and the method includes: acquiring a power saving signal; and performing an inactivity timer timeout processing according to the power saving signal.

6 Claims, 4 Drawing Sheets

INACTIVITY TIMER TIMEOUT PROCESSING METHODS AND APPARATUSES

CROSS REFERENCE TO RELATED APPLICATION

The present application is the national phase of International Application No. PCT/CN2019/085736 filed on May 6, 2019, the disclosure of which is hereby incorporated by reference in its entirety for all purposes.

TECHNICAL FIELD

The present disclosure relates to the field of communication technologies, and in particular, to inactivity timer timeout processing methods and apparatuses.

BACKGROUND

In related art, in order to enhance power saving performance of a terminal, a Discontinuous Reception (DRX for short) mechanism in a connected state is proposed. In the DRX in a connected state mechanism, the terminal may stop monitoring a Physical Downlink Control Channel (PDCCH for short) according to rules of the DRX, so as to save power. The terminal is configured with an On duration and an Opportunity for DRX (or referred to as a discontinuous receiving unit) when the DRX mechanism is used. An On duration time period is a time for the terminal to monitor PDCCH subframes. During the On duration time period, the terminal is in a wake up state. An Opportunity for DRX time period is a DRX sleep time period in which the terminal sleeps to save power without monitoring the PDCCH subframes to achieve the purpose of power saving.

SUMMARY

In order to overcome the problems in the related art, inactivity timer timeout processing methods and devices are provided in the present disclosure.

According to a first aspect of the present disclosure, an inactivity timer timeout processing method is provided, the method is applied to a terminal, the terminal is provided with an inactivity timer which is running, and the method includes: acquiring a power saving signal; and performing an inactivity timer timeout processing according to the power saving signal.

According to a second aspect of the present disclosure, an inactivity timer timeout processing apparatus is provided, including: an acquisition unit, configured to acquire a power saving signal and a processing unit, configured to perform an inactivity timer timeout processing according to the power saving signal.

According to a third aspect of the present disclosure, an inactivity timer timeout processing apparatus is providing, including: a processor; and a memory for storing instructions executable by the processor, where the processor is configured to perform the inactivity timer timeout processing method according to any aspect of the first aspect or the second aspect.

According to a fourth aspect of the present disclosure, a non-transitory computer readable storage medium is provided, where instructions in the storage medium, when executed by a processor of a mobile terminal, cause the mobile terminal to perform the inactivity timer timeout processing method according to any aspect of the first aspect or the second aspect.

Technical solutions provided by the embodiments of the present disclosure may include the following beneficial effects: by determining whether to perform inactivity timer timeout processing according to a power saving signal, a process to enable an inactivity timer that is running to time out ahead of time is performed, thereby optimizing the power saving effect of the terminal.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Figure 1:
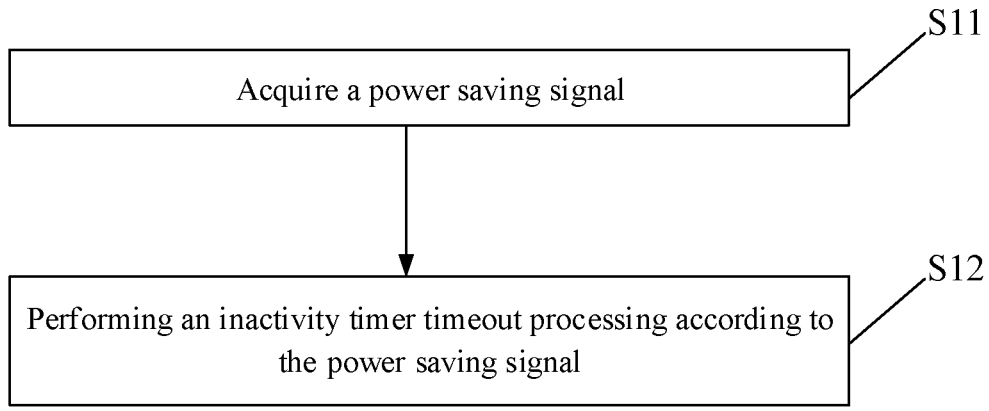
FIG. 1 is a flowchart illustrating an inactivity timer timeout processing method according to an embodiment.

Examples will be described in detail herein, with the illustrations thereof represented in the drawings. When the following descriptions involve the drawings, like numerals in different drawings refer to like or similar elements unless otherwise indicated. The implements described in the following embodiment do not represent all implements consistent with the present disclosure. Rather, they are merely examples of apparatuses and methods consistent with some aspects of the present disclosure as detailed in the appended claims.

In a New Radio (NR for short) communication system, an inactivity timer (or referred to as an InactivityTimer) can be configured for a terminal. In related art, if data transmission is not active for a period of time, the inactivity timer may time out. During a time period when the inactivity timer times out, the terminal may perform an inactivity timer timeout processing. The terminal performs the inactivity timer timeout processing, thereby saving power of the terminal.

In the present disclosure, an inactivity timer timeout processing method is provided. The inactivity timer timeout processing method is applied to a terminal. The terminal is provided with an inactivity timer which is running, and a process to enable the inactivity timer to time out ahead of time is performed, thereby optimizing the power saving effect of the terminal.

In the present disclosure, whether to perform a process to enable the inactivity timer to time out ahead of time can be determined through a first signal. The first signal may be a signal that can trigger the process to enable the inactivity timer to time out ahead of time, for example, the first signal may be a power saving signal.

FIG. 1 is a flowchart illustrating an inactivity timer timeout processing method according to an embodiment. As shown in FIG. 1, the inactivity timer timeout processing method is applied to a terminal and includes the following steps S11 to S12. A terminal, which can also be referred to as user equipment (UE for short), a mobile station (MS for short), a mobile terminal (MT for short), etc., is a device to provide users with voice and/or data connectivity. For example, the terminal may be a handheld device with wireless connection functionality, an on-board device, or the like. Some examples of the terminals are: mobile phone, Pocket Personal Computer (PPC for short), handheld computer, Personal Digital Assistant (PDA for short), notebook computer, tablet computer, wearable device, on-board device, or the like.

At step S11, a power saving signal is acquired.

In the embodiments of the present disclosure, the power saving signal can be understood as a signal that can reduce power consumption of the terminal. For example, the power saving signal may be a wake up signaling (WUS for short) signal. The WUS signal is a low-power detection signal introduced in an R16 power saving project of a New Radio (NR for short) communication system. It is usually configured that the WUS signal is before an On duration. If the terminal detects the WUS signal, it is to perform the PDCCH during the On duration; if the terminal does not detect the WUS signal, PDCCH monitoring during the entire On duration is skipped. For another example, the power saving signal may be a going to sleep (GTS for short) signal. If the terminal detects the GTS signal, it can quickly enter a sleep state.

In the embodiments of the present disclosure, the power saving signal may be sent by a base station to the terminal, or may be pre-configured by the system.

At step S12, the inactivity timer timeout processing is performed according to the power saving signal.

In the embodiments of the present disclosure, the terminal may determine whether to perform the inactivity timer timeout processing according to the power saving signal before performing the inactivity timer timeout processing according to the power saving signal. When the inactivity timer is in a running state, if the terminal determines to perform the inactivity timer timeout processing according to the power saving signal, a process to enable the inactivity timer to time out ahead of time is performed, so that the terminal automatically falls back to a default BWP or an initial BWP, or the terminal deactivates a Scell ahead of time, thereby saving the power consumption of the terminal. Therefore, in the embodiments of the present disclosure, the terminal determines whether to perform the inactivity timer timeout processing according to the power saving signal, thereby further optimizing the power saving effect of the terminal.

In the embodiments of the present disclosure, the inactivity timer includes one or more of a bandwidth part (BWP for short) inactivity timer and a secondary cell (or referred to as a Scell) deactivation timer.

In the present disclosure, on one hand, the inactivity timer may be the BWP inactivity timer. In the NR, a carrier bandwidth can be divided into multiple BWPs, and a terminal can be configured with multiple BWPs at a same time, but the terminal can only have at most one active BWP in a serving cell at the same time. The NR supports functionality of automatically falling back to a default BWP or an initial BWP when an active downlink BWP is inactive for a period of time. The base station can configure an initial BWP, a default BWP and a BWP inactivity timer for each serving cell of the terminal. In a case that the BWP inactivity timer is configured for the serving cell, when the BWP inactivity timer is started, if a PDCCH authorization is received, the BWP inactivity timer may be restarted. If data transmission is not active for a period of time, the BWP inactivity timer may time out, causing the terminal to fall back to the default BWP. The default BWP is a small bandwidth BWP. Based on small bandwidth BWP communication, power saving of the terminal can be realized. For example, when measuring based on a small bandwidth BWP, measuring GAP is independent of DRX, and measurements are to be performed even during a DRX off, thereby saving power of the terminal. Therefore, in the embodiments of the present disclosure, if it is determined to perform a process to enable the BWP inactivity timer to time out ahead of time according to the power saving signal, the terminal may fall back to the default BWP. If the terminal falls back to the default BWP, it may save more power. If it is determined not to perform BWP inactivity timer timeout processing according to the power saving signal, the terminal retains the currently active BWP.

On the other hand, the inactivity timer may be a secondary cell (or referred to as a Scell) deactivation timer. If the Scell is in the active state, the terminal is to perform a large number of measurements. For the Scell deactivation timer, there is also an optimization solution similar to the BWP early falling back, that is, it is to determine whether a process to enable the Scell deactivation timer to time out ahead of time is performed according to the power saving signal. When the process to enable the Scell deactivation timer to time out ahead of time is performed, the terminal is made to deactivate the Scell ahead of time to save power. When it is determined not to perform the process to enable the Scell deactivation timer to time out ahead of time according to the power saving signal, the terminal maintains the active state of the Scell.

In the present disclosure, a sleep time length of the terminal can be determined based on the power saving signal. Further, the terminal may determine a remaining time length of the running inactivity timer. In the embodiments of the present disclosure, it is determined whether to perform Scell deactivation timer timeout processing according to the remaining time length of the inactivity timer and the sleep time length determined based on the power saving signal.

In the embodiments of the present disclosure, the above-mentioned inactivity timer timeout processing method involved in the present disclosure will be described below in conjunction with practical applications.

Figure 2:
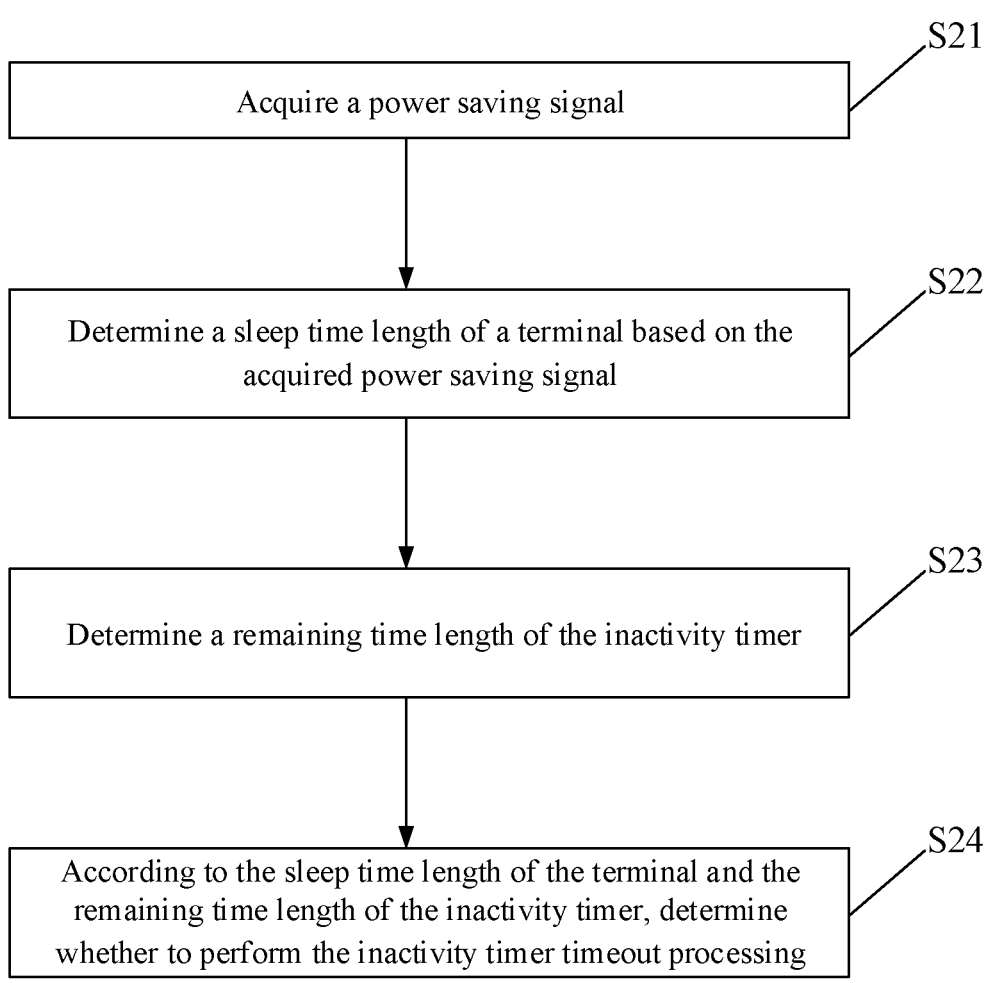
FIG. 2 is a flowchart illustrating another inactivity timer timeout processing method according to an embodiment.

FIG. 2 is a flowchart illustrating an inactivity timer timeout processing method according to another embodiment. As shown in FIG. 2, the inactivity timer timeout processing method includes the following steps S21 to S24.

At step S21, a power saving signal is acquired.

In the embodiments of the present disclosure, the power saving signal includes a WUS signal or a GTS signal.

At step S22, a sleep time length of a terminal is determined based on the acquired power saving signal.

Different power saving signals carry different information, therefore, different power saving signals have different manners of determining the sleep time length of the terminal.

Figure 3:
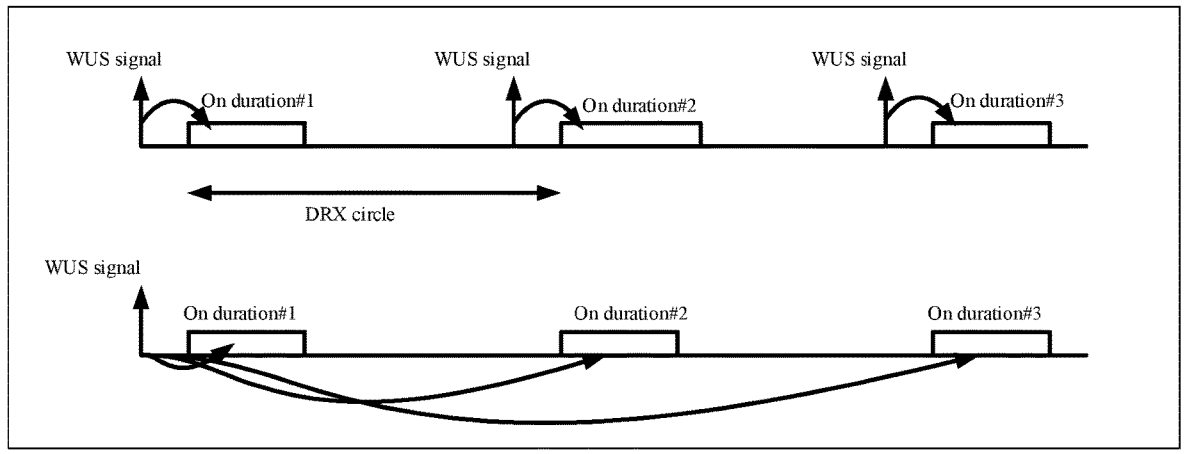
FIG. 3 is a schematic diagram illustrating a correspondence between a WUS signal and an On duration time period according to an embodiment.

In the present disclosure, the power saving signal is the WUS signal. There is a correspondence between the WUS signal and an On duration time period in a DRX cycle, which is usually 1:1 or 1:N, as shown in FIG. 3. If the terminal does not detect the WUS signal, it can skip monitoring of PDCCH subframes during a corresponding number of On durations. In this case, if the inactivity timer times out ahead of time, the power saving effect of the terminal can be optimized.

Figure 4:
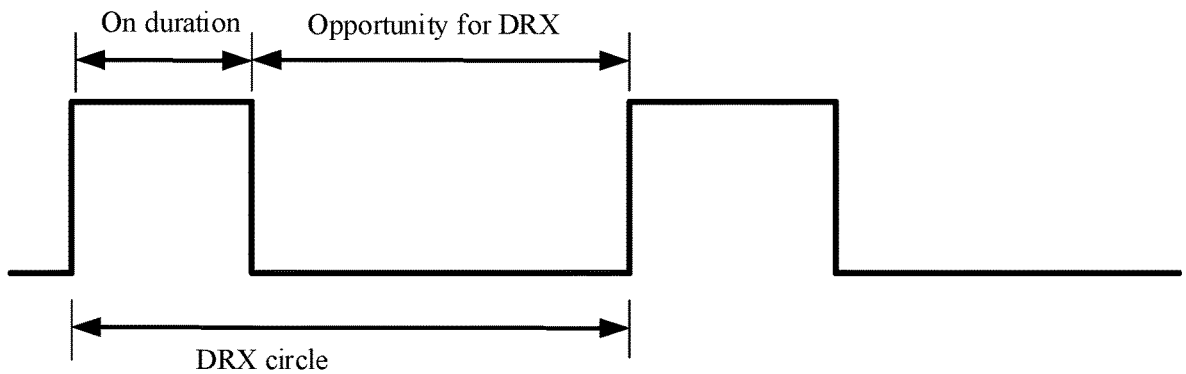
FIG. 4 is a schematic diagram illustrating a DRX cycle according to an embodiment.

A typical DRX cycle includes an On duration time period and an Opportunity for DRX time period, as shown in FIG. 4. A time length of the On duration is determined by a time length of the DRX cycle. In the embodiments of the present disclosure, on the one hand, the sleep time length of the terminal can be determined according to the time length of the DRX cycle and the corresponding number of the On durations for which the WUS signal is not detected. Assuming that the number of the On durations for which the WUS signal is not detected is K1, a sleep time length can be a time length of K1*DRX cycle. On the other hand, the sleep time length of the terminal can be determined according to a time interval in which the WUS signal is not detected. For example, if the time interval in which the WUS signal is not detected is T2, the sleep time length of the terminal may be T2.

In the present disclosure, the power saving signal is the GTS signal. The GTS signal may indicate a time interval in which monitoring of the PDCCH is skipped. The time interval in which monitoring of the PDCCH is skipped indicated by the GTS signal may be pre-configured by the system, or may be carried by the GTS signal sent by a base station to the terminal. In the embodiment of the present disclosure, the sleep time length of the terminal may be determined according to the time interval in which monitoring of the PDCCH is skipped indicated by the GTS signal. For example, if the time interval in which monitoring of the PDCCH is skipped indicated by the GTS signal is T3, the sleep time length of the terminal is T3.

At step S23, a remaining time length of the inactivity timer is determined.

In the embodiments of the present disclosure, the remaining time length of the inactivity timer can be acquired by reading data of the inactivity timer.

At step S24, according to the sleep time length of the terminal and the remaining time length of the inactivity timer, whether to perform the inactivity timer timeout processing is determined.

In the present disclosure, if the sleep time length of the terminal is greater than or equal to the remaining time length of the inactivity timer, it can be determined to perform the inactivity timer timeout processing. For example, if it is configured that the time interval in which the WUS signal is not detected is 5 ms, and the remaining time length of the inactivity timer is 3 ms, it can be determined to perform the inactivity timer timeout processing.

In the present disclosure, if the sleep time length is greater than or equal to a sum of the remaining time length and a BWP falling back delay time length, it can be determined to perform the inactivity timer timeout processing.

In the embodiments of the present disclosure, if it is determined to perform inactivity timer the timeout processing according to the sleep time length of the terminal and the remaining time length of the inactivity timer, corresponding timeout processing can be performed, such as terminating the running inactivity timer. Further, operations after terminating the inactivity timer can be performed. For example, if the inactivity timer is a BWP inactivity timer, after determining to perform the inactivity timer timeout processing according to the power saving signal, the terminal may fall back from a currently active BWP to a default BWP or an initial BWP. For another example, if the inactivity timer is a Scell deactivation timer, and it is determined to perform the inactivity timer timeout processing according to the power saving signal, the terminal deactivates the Scell.

Figure 5:
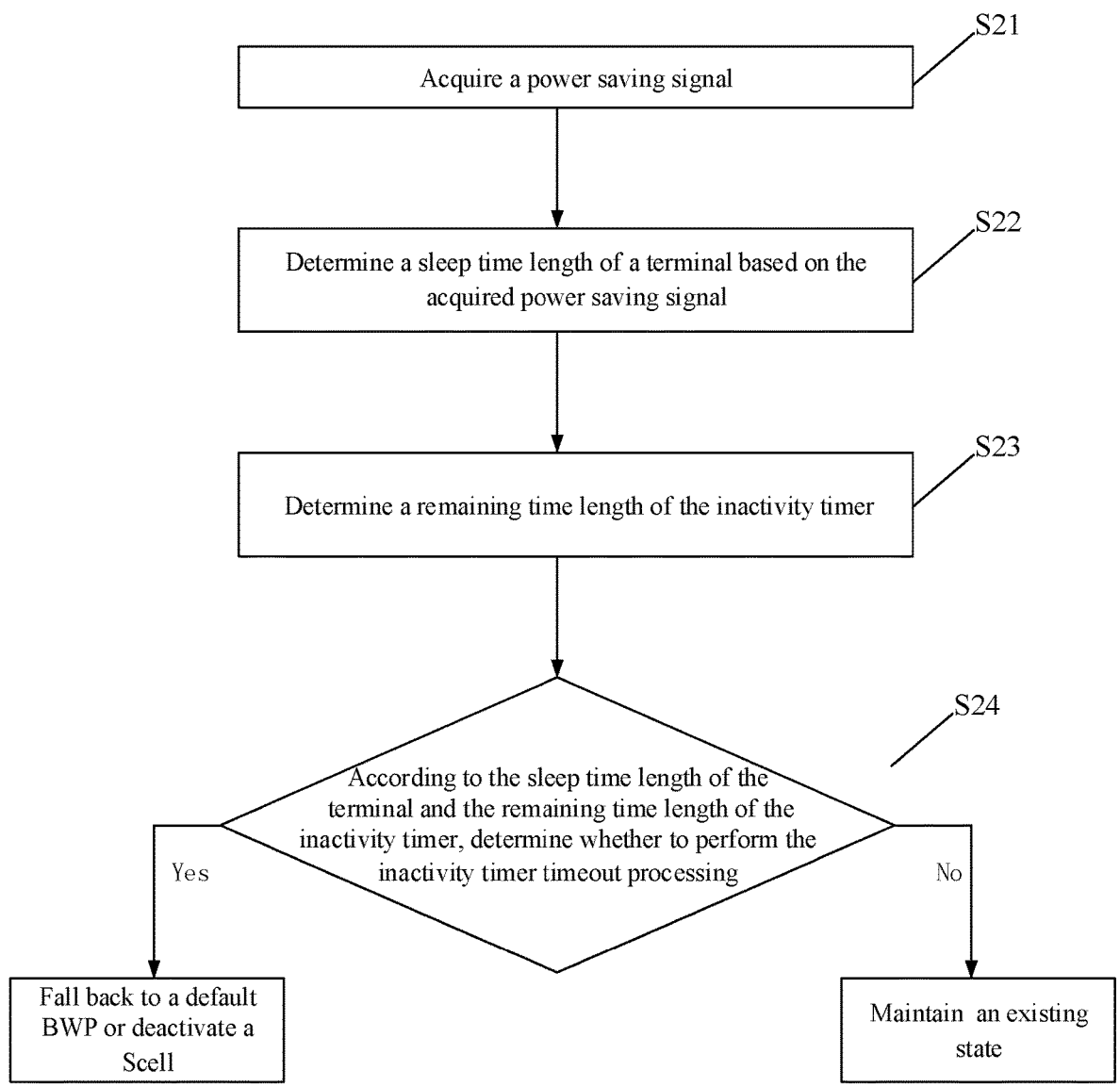
FIG. 5 is a flowchart illustrating yet another inactivity timer timeout processing method according to an embodiment.

Further, FIG. 5 is a flowchart illustrating another inactivity timer timeout processing method according to an embodiment. The method shown in FIG. 5 is similar to FIG. 4, except that in the embodiment of the present disclosure, after the terminal determines whether to perform the inactivity timer timeout processing according to the power saving signal, it can perform corresponding processing operations according to a determination result. As shown in FIG. 5, if it is determined to perform the inactivity timer timeout processing according to the power saving signal, the timeout processing can be performed ahead of time and operations after the timeout can be performed, such as terminating the running inactivity timer, and falling back to the default BWP or deactivate the Scell to achieve power saving effect. If it is determined that it is not to perform the inactivity timer timeout processing according to the power saving signal, an existing state can be maintained, such as keeping the currently active BWP or maintaining the active state of the Scell.

It can be understood that although operations are described in a particular order in the drawings in the embodiments of the present disclosure, it should not be understood that these operations need to be performed in the particular order or serial order shown, or that all of illustrated operations need to be performed to obtain a desired result. In certain scenarios, multitasking and parallel processing may be advantageous.

Based on similar concept, an inactivity timer timeout processing apparatus is provided in the embodiments of the present disclosure.

It can be understood that the inactivity timer timeout processing apparatus provided by the embodiments of the present disclosure includes a hardware structure and/or a software module corresponding to each function to implement the described function. In conjunction with the units and algorithm steps of the examples disclosed in the embodiments of the present disclosure, the embodiments of the present disclosure may be implemented in hardware or a combination of hardware and computer software. Whether a certain function is implemented in hardware or hardware driven by computer software depends on specific application and design constraints of technical solutions. Persons skilled in the art may use different methods to implement the described functions for each particular application, but such implementation should not be considered to be beyond the scope of the technical solutions of the embodiments of the present disclosure.

Figure 6:
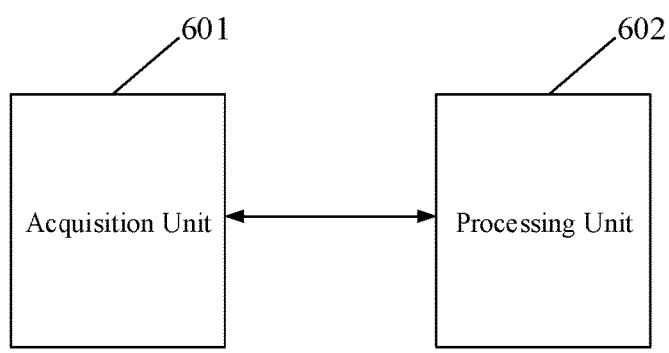
FIG. 6 is a block diagram illustrating an inactivity timer timeout processing apparatus according to an embodiment.

FIG. 6 is a block diagram illustrating an inactivity timer timeout processing apparatus 600 according to an embodiment. Referring to FIG. 6, the inactivity timer timeout processing apparatus 600 may include an acquisition unit 601 and a processing unit 602. The acquisition unit 601 is configured to acquire a power saving signal. The processing unit 602 is configured to determine whether to perform an inactivity timer timeout processing according to the power saving signal.

In one aspect, the processing unit 602 is further configured to: determine a sleep time length of the terminal based on the power saving signal; and determine a remaining time length of the inactivity timer. In this case, the processing unit 602 is configured to determine whether to perform the inactivity timer timeout processing according to the power saving signal in a following manner: according to the sleep time length and the remaining time length, determining whether to perform the inactivity timer timeout processing.

According to the sleep time length and the remaining time length, determining whether to perform the inactivity timer timeout processing, includes: in response to that the sleep time length is greater than or equal to the remaining time length, determining to perform the inactivity timer timeout processing.

In another aspect, the power saving signal includes a wake up signal or a going to sleep signal.

In another aspect, the power saving signal includes the wake up signal. The sleep time length is determined according to a time length of a DRX cycle and a corresponding number of DRX On durations for which the wake up signal is not detected and monitoring of a Physical Downlink Control Channel is skipped. For example, the sleep time length is a product of the time length of the DRX cycle and the number of the DRX On durations. The power saving signal includes the wake up signal, the sleep time length is determined according to a signal interval in which the wake up signal is not detected.

In another aspect, the power saving signal includes the going to sleep signal, and the sleep time length is determined according to a time interval in which monitoring is skipped indicated by the going to sleep signal.

In another aspect, the inactivity timer includes one or more of a BWP inactivity timer and a Scell deactivation timer.

In another aspect, the inactivity timer includes the BWP inactivity timer, and the processing unit 602 is further configured to: in response to that it is determined to perform the inactivity timer timeout processing according to the power saving signal, fall back from a currently active BWP to a default BWP or an initial BWP.

In another aspect, the inactivity timer includes the Scell deactivation timer, and the processing unit 602 is further configured to: in response to that it is determined to perform the inactivity timer timeout processing according to the power saving signal, deactivating a Scell.

In another aspect, the processing unit 602 is configured to perform the inactivity timer timeout processing by terminating the inactivation timer which is running.

It can be understood that for the apparatus in the above mentioned embodiments, the specific manner in which each module performs operations has been described in detail in the embodiments of the method, and will not be described in detail herein.

Figure 7:
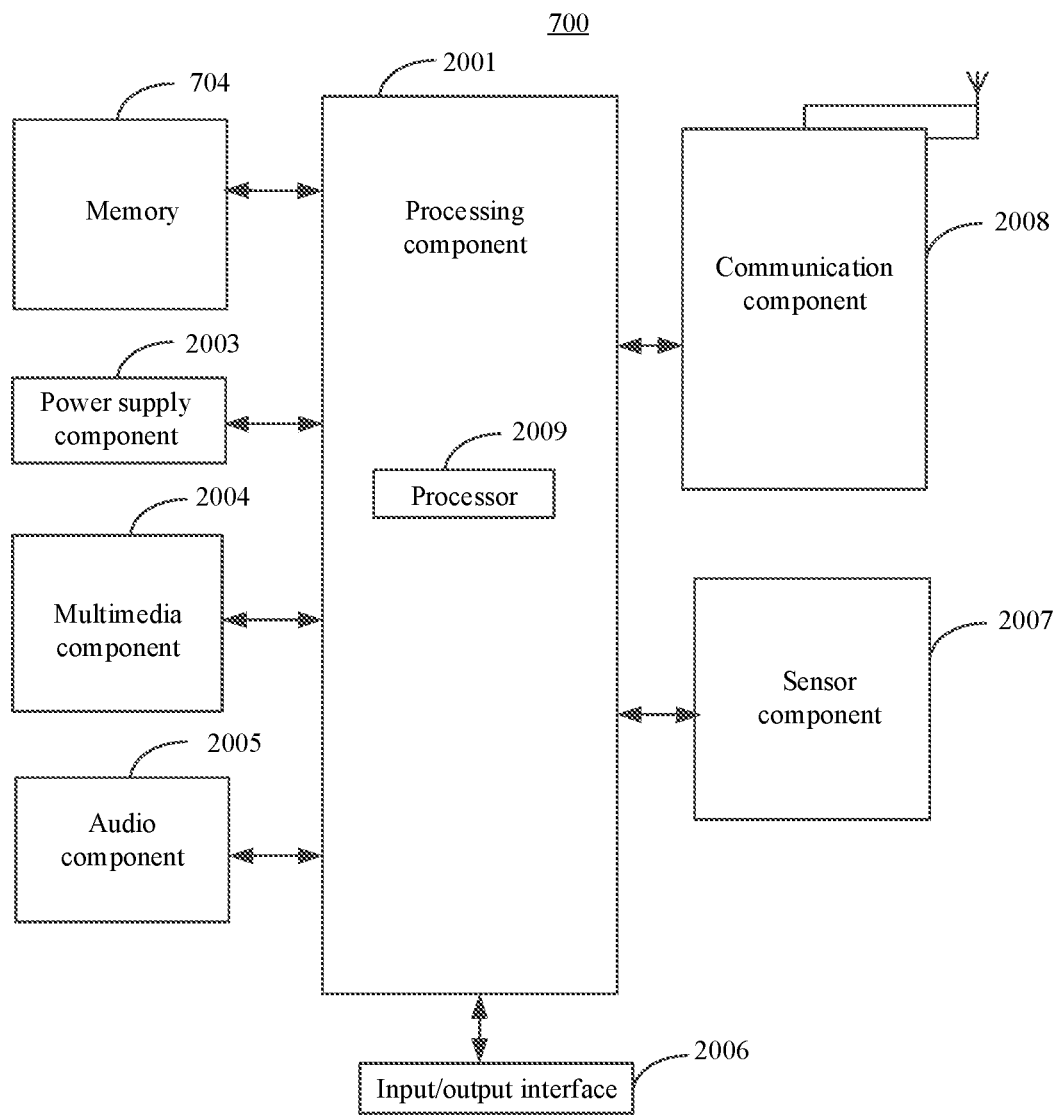
FIG. 7 is a block diagram illustrating another apparatus for inactivity timer timeout processing according to an embodiment.

An inactivity timer timeout processing apparatus 700 is provided in the embodiments of the present disclosure. FIG. 7 is a block diagram illustrating an inactivity timer timeout processing apparatus 700 according to an embodiment. For example, the apparatus 700 may be a mobile phone, a computer, a digital broadcast terminal, a message transceiving device, a game console, a tablet device, a medical equipment, a fitness equipment and a personal digital assistant.

As shown in FIG. 17, the apparatus 700 may include one or more of the following components: a processing component 702, a memory 704, a power supply component 706, a multimedia component 708, an audio component 710, an input/output (I/O) interface 712, a sensor component 714 and a communication component 716.

The processing component 702 generally controls overall operations of the apparatus 700, such as operations associated with display, phone calls, data communications, camera operations, and recording operations. The processing component 702 may include one or more processors 820 to execute instructions so as to complete all or part of the steps of the above methods. For example, the processors 820 are configured to acquire a power saving signal and determine whether to perform an inactivity timer timeout processing according to the power saving signal. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data, for example, store instructions executable by the processors 820, to support the operation of the apparatus 700. Examples of such data include instructions for any application or method operated on the apparatus 700, contact data, phonebook data, messages, pictures, videos, and so on. The memory 704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 706 supplies power for different components of the apparatus 700. The power supply component 706 may include a power supply management system, one or more power supplies, and other components associated with generating, managing and distributing power for the apparatus 700.

The multimedia component 708 includes a screen providing an output interface between the apparatus 700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 708 may include a front camera and/or a rear camera. The front camera and/or rear camera may receive external multimedia data when the apparatus 700 is in an operating mode, such as a photographing mode or a video mode. Each of the front camera and the rear camera may be a fixed optical lens system or have focal length and optical zooming capability.

The audio component 710 is to output and/or input an audio signal. For example, the audio component 710 includes a microphone (MIC). When the apparatus 700 is in an operating mode, such as a call mode, a record mode and a voice recognition mode, the microphone is to receive an external audio signal. The received audio signal may be further stored in the memory 704 or sent via the communication component 716. In some examples, the audio component 710 further includes a speaker for outputting an audio signal.

The I/O interface 712 provides an interface between the processing component 702 and a peripheral interface module. The above peripheral interface module may be a keyboard, a click wheel, buttons, or the like. These buttons may include but not limited to, a home button, a volume button, a start button and a lock button.

The sensor component 714 includes one or more sensors to provide status assessments of various aspects for the apparatus 700. For example, the sensor component 714 may detect the on/off status of the apparatus 700, and relative positioning of the component, for example, the component is a display and a keypad of the apparatus 700. The sensor component 714 may also detect a change in position of the apparatus 700 or a component of the apparatus 700, a presence or absence of the contact between a user and the apparatus 700, an orientation or an acceleration/deceleration of the apparatus 700, and a change in temperature of the apparatus 700. The sensor component 714 may include a proximity sensor to detect the presence of a nearby object without any physical contact. The sensor component 714 may further include an optical sensor, such as a Complementary Metal-Oxide-Semiconductor (CMOS) or Charged Coupled Device (CCD) image sensor which is used in imaging applications. In some examples, the sensor component 714 may further include an acceleration sensor, a gyroscope sensor, a magnetic sensor, a pressure sensor, or a temperature sensor.

The communication component 716 is to facilitate wired or wireless communication between the apparatus 700 and other devices. The apparatus 700 may access a wireless network based on a communication standard, such as Wi-Fi, 2G or 3G, or a combination thereof. In an example, the communication component 716 receives a broadcast signal or broadcast related information from an external broadcast management system via a broadcast channel. In an example, the communication component 716 may further include a Near Field Communication (NFC) module for promoting short-range communication. For example, the NFC module may be implemented based on a radio occurrence identification (RFID) technology, an infrared data association (IrDA) technology, an ultra-wideband (UWB) technology, a Bluetooth (BT) technology and other technologies.

In an example, the apparatus 700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 704 including instructions. The above instructions may be executed by the processor 1709 of the apparatus 700 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

A non-transitory computer readable storage medium is provided in the embodiments of the present disclosure. Instructions in the storage medium, when executed by a processor of a mobile terminal, cause the mobile terminal to perform the inactivity timer timeout processing method according to the above mentioned embodiments.

After considering the specification and practicing the present disclosure, the persons skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the claims of the present disclosure.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. An inactivity timer timeout processing method, comprising:
   acquiring, by a terminal comprising an inactivity timer which is running, a power saving signal; and
   performing, by the terminal, an inactivity timer timeout processing according to the power saving signal;
   wherein before performing the inactivity timer timeout processing according to the power saving signal, the method further comprises:
   determining a sleep time length of the terminal based on the power saving signal;
   determining a remaining time length of the inactivity timer; and
   in response to determining that the sleep time length is greater than or equal to the remaining time length, determining to perform the inactivity timer timeout processing;
   wherein the power saving signal comprises a wake up signal, and the sleep time length is determined according to a signal interval in which the wake up signal is not detected.

2. The inactivity timer timeout processing method of claim 1, wherein the inactivity timer comprises one or more of a bandwidth part (BWP) inactivity timer and a secondary cell (Scell) deactivation timer.

3. The inactivity timer timeout processing method of claim 2, wherein the inactivity timer comprises the BWP inactivity timer, and
   in response to that it is determined to perform the inactivity timer timeout processing according to the power saving signal, the inactivity timer timeout processing comprises: the terminal falls back from a currently active BWP to a default BWP or an initial BWP.

4. The inactivity timer timeout processing method of claim 2, wherein the inactivity timer comprises the Scell deactivation timer, and
   in response to that it is determined to perform the inactivity timer timeout processing according to the power saving signal, the inactivity timer timeout processing comprises: the terminal deactivates a Scell.

5. An inactivity timer timeout processing apparatus, comprising:
   a processor; and
   a memory for storing instructions executable by the processor,
   wherein the processor is configured to:
   acquire a power saving signal; and
   perform an inactivity timer timeout processing according to the power saving signal, wherein the processor is further configured to:
   before performing the inactivity timer timeout processing according to the power saving signal, determine a sleep time length of the terminal based on the power saving signal; and determine a remaining time length of the inactivity timer; and in response to that the sleep time length is greater than or equal to the remaining time length, determining to perform the inactivity timer timeout processing;

wherein the power saving signal comprises a wake up signal, and the sleep time length is determined according to a signal interval in which the wake up signal is not detected.

6. A non-transitory computer readable storage medium, wherein instructions in the storage medium, when executed by a processor of a mobile terminal, cause the mobile terminal to:

acquire a power saving signal; and perform an inactivity timer timeout processing according to the power saving signal, wherein before performing the inactivity timer timeout processing according to the power saving signal, the mobile terminal is caused to:

determine a sleep time length of the terminal based on the power saving signal;

determine a remaining time length of the inactivity timer; and in response to that the sleep time length is greater than or equal to the remaining time length, determining to perform the inactivity timer timeout processing;

wherein the power saving signal comprises a wake up signal, and the sleep time length is determined according to a signal interval in which the wake up signal is not detected.

* * * * *